US010013619B2

(12) United States Patent
Abhau

(10) Patent No.: US 10,013,619 B2
(45) Date of Patent: Jul. 3, 2018

(54) METHOD AND DEVICE FOR DETECTING ELLIPTICAL STRUCTURES IN AN IMAGE

(71) Applicant: MANDO CORPORATION, Gyeonggi-do (KR)

(72) Inventor: Jochen Abhau, Frankfurt am Main (DE)

(73) Assignee: MANDO CORPORATION, Gyeonggi-Do (KR)

( * ) Notice: Subject to any disclaimer, the term of this patent is extended or adjusted under 35 U.S.C. 154(b) by 0 days.

(21) Appl. No.: 15/081,838

(22) Filed: Mar. 25, 2016

(65) Prior Publication Data

US 2016/0283806 A1    Sep. 29, 2016

(30) Foreign Application Priority Data

Mar. 26, 2015 (DE) .................. 10 2015 205 505

(51) Int. Cl.
*G06K 9/00* (2006.01)
*G06K 9/46* (2006.01)
*G06T 7/12* (2017.01)

(52) U.S. Cl.
CPC ....... *G06K 9/00818* (2013.01); *G06K 9/4633* (2013.01); *G06T 7/12* (2017.01); *G06T 2207/20061* (2013.01)

(58) Field of Classification Search
CPC ............ G06K 9/00818; G06K 9/4604; G06K 9/4638; G06K 9/4633; G06K 9/3233;

(Continued)

(56) References Cited

U.S. PATENT DOCUMENTS 4,618,989 A   10/1986   Tsukune et al.
8,170,340 B2   5/2012   Klefenz
(Continued)

FOREIGN PATENT DOCUMENTS

WO     2013/052812     4/2013

OTHER PUBLICATIONS

Office Action dated Jul. 20, 2017 for Korean Patent Application No. 10-2016-0036633 and its English machine translation by Global Dossier.

(Continued)

*Primary Examiner* — Yon Couso
(74) *Attorney, Agent, or Firm* — Ladas & Parry, LLP

(57) ABSTRACT

The invention relates to method of detecting elliptical structures (10) in an image (9), comprising:
  detecting circular arc-shaped structures (11) in the image (9) using a circle Hough transform (CHT) of the image (9), wherein a radius and a center point (12) are determined for each circular arc-shaped structure (11),
  identifying pairs of circular arc-shaped structures (11) consisting of two of the detected circular arc-shaped structures (11) with substantially equal radii,
  defining, for each one of these pairs, a search area (14) within the image (9) depending on the center points (12) of the respective pair of circular arc-shaped structures (11),
  searching in the search area (14) defined for any given pair of circular arc-shaped structures (11), for a pair of edges (16) connecting these two circular arc-shaped structures (11). The invention further relates to a device for detecting elliptical structures in an image.

13 Claims, 7 Drawing Sheets

Figure 1:
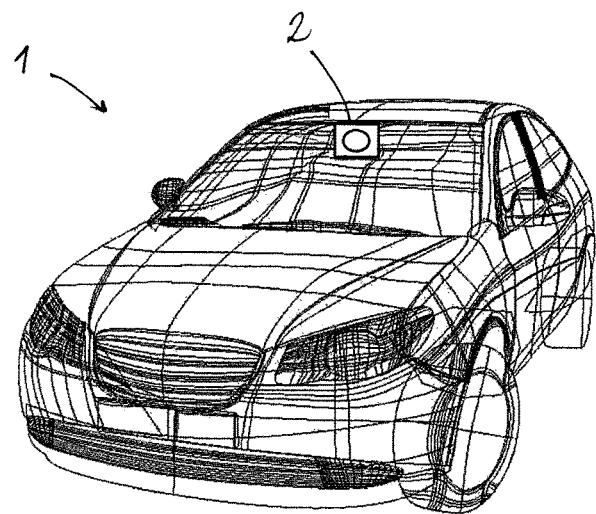

(58) Field of Classification Search
CPC ........... G06K 9/3241; G06T 7/12; G06T 7/10;
G06T 7/60; G06T 7/149; G06T 7/168;
G06T 7/174; G06T 2207/20061; G08G
1/09623; B60W 2420/42
See application file for complete search history.

(56) References Cited

U.S. PATENT DOCUMENTS

| | | | | |
|---|---|---|---|---|
| 2010/0067805 | A1* | 3/2010 | Klefenz | G06K 9/4633 382/201 |
| 2010/0310129 | A1* | 12/2010 | Hopfner | G06K 9/44 382/104 |
| 2010/0329513 | A1* | 12/2010 | Klefenz | G01C 21/00 382/104 |
| 2014/0153834 | A1* | 6/2014 | Poyil | G06K 9/00818 382/199 |
| 2015/0278615 | A1* | 10/2015 | Ogawa | G06K 9/00818 348/148 |
| 2016/0155012 | A1* | 6/2016 | Takahashi | G06K 9/4633 382/281 |

OTHER PUBLICATIONS

Notice of Allowance dated Dec. 12, 2017 for Korean Patent Application No. 10-2016-0036633 and its English machine translation by Global Dossier.

* cited by examiner

METHOD AND DEVICE FOR DETECTING ELLIPTICAL STRUCTURES IN AN IMAGE

CROSS-REFERENCE TO RELATED APPLICATION

This application claims the priority to German Patent Application No. 102015205505.1, filed on Mar. 26, 2015, the disclosure of which is incorporated herein by reference in its entirety.

The present invention relates to a method and a device for detecting elliptical structures in an image. The present invention further relates to a method and a system for providing assistance to a driver of a vehicle and to a vehicle equipped with such a system. Moreover, the present invention relates to means for detecting traffic signs.

Detecting elliptical structures in images has applications in various fields of technology. Detecting elliptical structures may be required, for instance, for identifying circular road traffic signs (or any other circular objects) which appear elliptically distorted in an image. Elliptical distortions of an originally circular traffic sign occur, for instance, when the traffic sign appears near the edges of the image or if the traffic sign is tilted or rotated relatively to the camera such that the camera, which is used for taking the image, is directed not straightly but obliquely onto the circular front side of the traffic sign. This is, however, the typical situation when the camera is mounted on a vehicle and the traffic sign is located at the side of the road.

Standard technologies of traffic sign detection, which do not take into account such effects, fail on tilted or skewed circular traffic signs, and as a result, these signs are either not detected at all or a large number of false positives are generated, resulting in poor runtimes of the respective system. A driver assistance system should thus be able to reliably detect and identify circular traffic signs even in the above-mentioned cases since the user relies on the information provided by the system.

One of the known methods to detect elliptical structure in images is using the elliptical Hough transform. The elliptical Hough transform requires five parameters to define an ellipse and thus consumes much time and memory capacity. In order to overcome these problems, modified Hough transform methods have been proposed.

For instance, publication U.S. Pat. No. 4,618,989 A discloses a method to identify ellipses by decomposing the five-dimensional Hough transformation space into three one or two dimensional sub-spaces: a two-dimensional center histogram space, a two-dimensional eccentricity and axis slope histogram space and a one-dimensional C histogram space. Since this method also uses multiple parametric spaces, it is time and memory consuming.

Publication U.S. Pat. No. 8,170,340 B2 discloses a method to identify traffic signs in an image using a Hough transformer which identifies a plurality of line sections running through the image in different directions, a further Hough transformer to identify circular or elliptical arc segments and an ellipse detector to detect the location of the ellipse. This method uses two different Hough transformers which is time and memory consuming.

Publication WO 2013/052812 A1 discloses a method to detect ellipses based on symmetry properties of ellipses. It employs a voting scheme based on positively and negatively affected pixels. This method gives good performance at low computational cost. But when the background of the ellipse is uneven, e. g. black background on one half of the ellipse and white background on the other half of the ellipse, this method fails due to the gradient orientation calculated.

The present invention thus aims at providing means for detecting elliptical structures in an image as reliably and as quickly as possible while consuming only relatively little memory capacity.

This problem is solved by a method of detecting elliptical structures according to independent claim 1 and by a device for detecting elliptical structures in an image according to claim 12. Some exemplary embodiments of the invention are subject-matter of the dependent claims.

The proposed method of detecting elliptical structures in an image thus comprises the steps of:

detecting circular arc-shaped structures in the image by means of a circle Hough transform (CHT) of the image, wherein a radius and a center point are determined for each circular arc-shaped structure, identifying pairs of circular arc-shaped structures consisting of two of the detected circular arc-shaped structures with substantially equal radii, defining, for each of the pairs of circular arc-shaped structures, a search area within the image depending on the center points of the respective pair of circular arc-shaped structures, searching, for each of the pairs of circular arc-shaped structures, in the search area defined for the pair of circular arc-shaped structures, for a pair of edges connecting the two circular arc-shaped structures of this pair of circular arc-shaped structures, identifying, if a pair of edges connecting the two circular arc-shaped structures of a pair of circular arc-shaped structures has been found, an area enclosed by this pair of edges and this pair of circular arc-shaped structures as an elliptical structure.

In the proposed method, instead of performing a high-dimensional ellipse Hough transform, a comparatively simple circle Hough transform of the image is used to detect circular arc-shaped structures. The proposed method makes use of the fact that any ellipse has two ends which approximately have the shape of circular arcs. Detecting two (approximately straight) edges connecting a pair of circular arc-shaped structures is thus used as an indicator for an elliptical structure in the image. The main advantage of the proposed method is that relatively little computing time and memory capacity are required in this way, since elliptical structures are detected without using an ellipse Hough transform.

The image is typically a digital image which is defined by image data, e.g. each image point of the image (also termed as pixel of the image) has an image value (also termed as pixel value), such as a brightness value of the image point. Initially, the image (i.e. the image data) may optionally be pre-processed, for instance to transform the image into a grayscale image or into a binary image. Additionally or alternatively, the pre-processing of the image may include applying a noise reduction algorithm to reduce noise in the image. Additionally or alternatively, the pre-processing of the image may include a gradient extraction algorithm for calculating a gradient of the image values (i.e. pixel values), such as the gradient of the image brightness (e.g. of the grayscale value) of the image at each image point. Calculating the gradient may include both calculating the absolute value and the orientation of the gradient at each image point. Alternatively, it is also possible to calculate only the gradient orientation at each image point. A result of the gradient extraction algorithm can be a gradient image, i.e. an image containing, at each of its image points, the respective gradient or normalized gradient of the original image. Additionally or alternatively, the pre-processing of the image may include applying an edge detection algorithm on the image, such as the Canny edge detection algorithm or the Sobel edge detection algorithm. The edge detection algorithm is typically used to identify those image points at which the image value (such as the brightness) changes sharply. Such points are typically arranged in lines and thus form edges. A result of an edge detection algorithm can thus be an edge image, i.e. an image only containing the detected edges of the image. The circular Hough transform may be computed based on the original image data or on the pre-processed image data. In particular, it is possible to calculate the circular Hough transformation using a result of a gradient extraction algorithm, such as the gradient image, and/or the result of an edge detection algorithm, such as the edge image.

In principle, techniques for calculating a circular Hough transform of an image are generally well-known in the art of image processing. It typically comprises defining a circle Hough parameter space, applying a voting scheme and calculating a circle Hough accumulator (also referred to as voting array). Accordingly, the above-mentioned step of detecting circular arc-shaped structures in the image may include the steps of:

defining a circle Hough parameter space and a circle Hough accumulator, wherein each parameter point of the circle Hough parameter space defines a possible circle (or a circle candidate) in the image, and wherein the circle Hough accumulator assigns a value to each parameter point, identifying image points of the image which vote for one or more of the circles defined by the parameter points, increasing the values of the circle Hough accumulator depending on the number of image points which are identified as voting for the circles defined by the respective parameter points, detecting parameter points in the circle Hough parameter space at which the circle Hough accumulator exceeds a predefined threshold value and/or at which the circle Hough accumulator has a local maximum, wherein the detected circular arc-shaped structures are represented by the detected parameter points.

The circle Hough parameter space is typically may be defined as usual for circle Hough transforms such that each of the parameter points of the circle Hough parameter space has three-components, two components (x, y) defining the coordinates of the center point of a circle in the image and one component (r) defining the radius of this circle. Then, each possible circle in the image is represented by one of the parameter points in the three-dimensional circle Hough parameter space. The circle Hough accumulator, which is also referred to as the accumulator in the following, can be defined as a function of the parameter points of the three-dimensional circle Hough parameter space, i.e. as a function which assigns a value $A(x, y, r)$ to each parameter point $(x, y, r)$.

The value of the accumulator at any given parameter point represents the likelihood of the presence of a circle arc-shaped structure or of a complete circle in the image having the radius and the center point defined by that parameter point. The value of the accumulator at a given parameter point may be defined as being proportional or equal to the number of image points that vote for the circle which is represented by that parameter point. According to one possible voting scheme, an image point votes for a circle with a defined center point and radius (i.e. the image point votes for the corresponding parameter point) when it is located on the circumferential line of that circle (i.e. the distance of the image point to the center point of the circle equals the radius of the circle) and if it additionally has a large gradient value and/or a gradient orientation directed towards the center point of the circle or directed into the opposite direction. In addition, it may be required that the gradient has a magnitude exceeding a certain threshold if the corresponding image point is to contribute to the accumulator by voting for a particular circle. According to another possible voting scheme, an image point votes for a circle when this image point is located on an edge in the image which runs, at least partly or completely, along the circumferential line of the circle. In this case, it may be required that a straight line which crosses the edge at this image point and which is oriented perpendicularly to the edge at this image point runs through the center point of this circle.

A circle in the image thus gives high accumulator values to parameter points defining approximately its center point and its radius, and relatively small values to parameters points defining center points around the center point of this circle and/or defining slightly different radii. Accordingly, a circular arc-shaped structure in the image also gives increased accumulator values to parameter points representing approximately its center point and radius (these accumulator values are however smaller than the corresponding accumulator values in case of a complete circle), and relatively small values to parameter points defining center points around its center point and/or defining radii which are different from its radius (these accumulator values are again smaller than the corresponding accumulator values in case of a complete circle).

Thus, in case of an elliptical structure in the image, it can be observed that the values of the accumulator $A(x, y, r)$ are at least slightly increased and usually show local maxima at two center points for a given radius (or for a range of substantially equal radii) corresponding to the two approximately circle arc-shaped ends of the elliptical structure. These two increased values or local maxima of the accumulator are however relatively small as compared to the typically very large accumulator values at the one center point of a complete circle. Accordingly, for a circular traffic sign, which appears as an elliptic structure in the image, the accumulator does not provide one single high value or high local maximum, but rather two slightly increased values or smaller local maxima at two image points which are relatively close to each other.

In one example, the circular arc-shaped structures in the image are searched for by thresholding, i.e. by comparing the values of the accumulator with the above-mentioned predetermined threshold value. The threshold value may be determined depending on the radius of the circle defined by the respective parameter point. For instance, the threshold value may be proportional to that radius.

Alternatively or additionally to thresholding, the circular arc-shaped structures in the image may be searched by searching for local maxima of the circle Hough accumulator.

The above-mentioned identified pairs of circular arc-shaped structures are identified such that the radii of the circular arc-shaped structures are substantially equal. The radii of a pair of circular arc-shaped structures may be considered as substantially equal when a relative difference between the two radii of the pair of circular arc-shaped structures is, for instance, less than 10%, of the larger radius of the two radii. In one embodiment, the pairs of circular arc-shaped structures may be identified such that a distance between the center points of the circular arc-shaped structures of each one of the identified pair is less than a distance threshold, wherein the distance threshold may be defined in dependence of the radii of the circular arc-shaped structures of the pair of circular arc-shaped structures. For example, the distance threshold could be defined as anywhere between ten times and twenty times the radius of a detected circular arc-shaped structure.

As described above, a single high value of the accumulator may be used as an indicator for a circular traffic sign which actually appears as a circle in the image. Thus, in one embodiment of the proposed method, a detected circular arc-shaped structure, which is included in none of the identified pairs of circular arc-shaped structures, may be identified as a complete circle if the value of the circle Hough accumulator at the parameter point representing this detected circular arc-shaped structure exceeds a predefined threshold. This pre-defined threshold should be greater than the above-mentioned predefined threshold value that may be used for detecting the circular arc-shaped structures.

As described above, after having identified the pairs of circular arc-shaped structures, the image is processed further. For this purpose, the original image data may be used or, if existing, the pre-processed image data may be used. If the optional edge detection algorithm has been applied, for instance, any detected edges or edge image of the image may be used for searching the pairs of edges in the defined search areas. In this case, the step of searching the pairs of edges in the defined search areas may further includes assessing the edges of the image which have been detected by means of the edge detection algorithm applied to the image before calculating the circle Hough transform of the image.

The step of searching the pairs of edges may include, in particular if no edge detection algorithm has been performed before this step, applying an edge detection algorithm, such as the Canny edge detection or the Sobel edge detection algorithm. Preferably the edge detection algorithm is applied exclusively to the defined search areas, whereas regions located outside the defined search region are left out. Since edge detection algorithms generally consume relatively large amounts of time and memory capacity, this embodiment is particularly advantageous, since the application of the edge detection algorithm is restricted to the respective search areas.

In some embodiments of the proposed method, the search area for any of the identified pairs of circular arc-shaped structures may consist of two subareas which are separated from each other by a straight connection line which connects the two center points of the respective pair of circular arc-shaped structures. In this case, the steps of searching for a pair of edges may be restricted to searching for a pair of edges for which each one of two separated subareas of the search area defined for the respective pair of circular arc-shaped structures includes one of the two detected edges of this pair of edges.

In some embodiments, the method may further include, for each pair of edges found for one of the pairs of circular arc-shaped structures, one or two of the following steps:
evaluating whether the edges are substantially straight, wherein substantially straight may be defined, for instance, as having a radius of curvature larger than the radii, or larger than twice the radii, of the respective pair of circular arc-shaped structures,
comparing the lengths of the two edges with a distance between the center points of the respective pair of circular arc-shaped structures.

The suggested method of ellipse detection may be used for various applications, for example for finding mechanical parts for automatic assembly in industries or for providing assistance to a driver of a vehicle.

The elliptical structure detected in the image by means of the method described here may, in particular, be a round traffic sign which may appear elliptically for the reasons explained above. Using the information obtained by the proposed method, such as center point information and the edge information, it can in particular be determined reliably if a tilted or skewed traffic sign is present in the image and, if so, where it can be found in the image for further analysis.

A useful method of providing assistance to a driver of a vehicle may comprise, for instance, the steps of:
producing images of a surrounding of the vehicle by means of at least one camera,
detecting elliptical structures in the images by means of the method of detecting circular structures in an image described above, and
identifying circular traffic signs using information about the detected elliptical structures.

Thus, in typical embodiments, the detected elliptical structures may be identified as circular traffic signs or as candidates for circular traffic signs. The method may further include a step of further analysis of any identified candidate for a circular traffic sign. The thus identified circular traffic signs may be classified, for instance, according to the instructions or the information expressed by the respective traffic sign, such as warnings or speed limits. Information about the identified circular traffic signs may be provided to the driver, for instance by means of a driver information unit.

Accordingly, the proposed device for detecting elliptical structures in an image comprises an image data processing unit which is configured to perform the steps of the proposed method in any of the embodiments described above. In particular, the data processing unit may be configured to perform the steps of:
detecting circular arc-shaped structures in the image by means of a circle Hough transform (CHT) of the image, a radius and a center point being determined for each circular arc-shaped structure,
identifying pairs of circular arc-shaped structures consisting of two of the detected circular arc-shaped structures with substantially equal radii,
defining, for each of the pairs of circular arc-shaped structures, a search area within the image depending on the center points of the respective pair of circular arc-shaped structures,
searching, for each of the pairs of circular arc-shaped structures, in the search area defined for the pair of circular arc-shaped structures, for a pair of edges connecting the two circular arc-shaped structures of this pair of circular arc-shaped structures,
identifying, if a pair of edges connecting the two circular arc-shaped structures of a pair of circular arc-shaped structures is found, an area enclosed by this pair of edges and this pair of circular arc-shaped structures (11) as an elliptical structure.

A device of the type described above may, in particular, be used in a driver assistance system for detecting traffic signs which comprises:
at least one camera for producing images of a surrounding of a vehicle,
the device for detecting elliptical structures in an image, wherein the image data processing unit of the device is coupled to the at least one camera to receive the images from the camera and wherein the data processing unit may be configured to identify the detected elliptical structures as circular traffic signs, and a driver information unit coupled to the data processing unit and configured to provide information on the thus identified circular traffic signs to the driver.

The at least one camera of the driver assistance system may be installed in a vehicle, for example for example behind a windscreen, to produce images of a surrounding of the vehicle.

In the following, exemplary embodiments of the invention are described in more detail referring to the FIGS. 1 to 5D. There are shown in FIG. 1 a schematic representation of a vehicle with a driver assistance system, FIG. 2 a schematic representation of an embodiment of a driver assistance system, FIG. 3 a flow diagram illustrating steps of a method of providing assistance to a driver of a vehicle, which may be performed by the driver assistance system of FIG. 2, FIGS. 4A-C an image showing an elliptical structure, FIGS. 5A-B a circular image of a circular traffic sign, and FIGS. 5C-D an elliptic image of a circular traffic sign.

In the figures, similar or identical features are provided with the same reference signs. A list of reference signs is provided below.

FIG. 1 shows a schematic representation of a vehicle 1. A driver assistance system is installed in the vehicle 1. In FIG. 1, a camera 2 of the driver assistance system is shown which is installed in the vehicle 1 in a position behind a front screen of the vehicle 1. In this way, digital images of a surrounding of the vehicle 1 in front of the vehicle 1 can be produced by means of this camera 1. The driver assistance system of the vehicle 1 may include two further cameras (not shown in FIG. 1) mounted in the vehicle 1 at further positions such that images of the surrounding on both sides of the vehicle 1 are produced by means of these further cameras.

Figure 2:
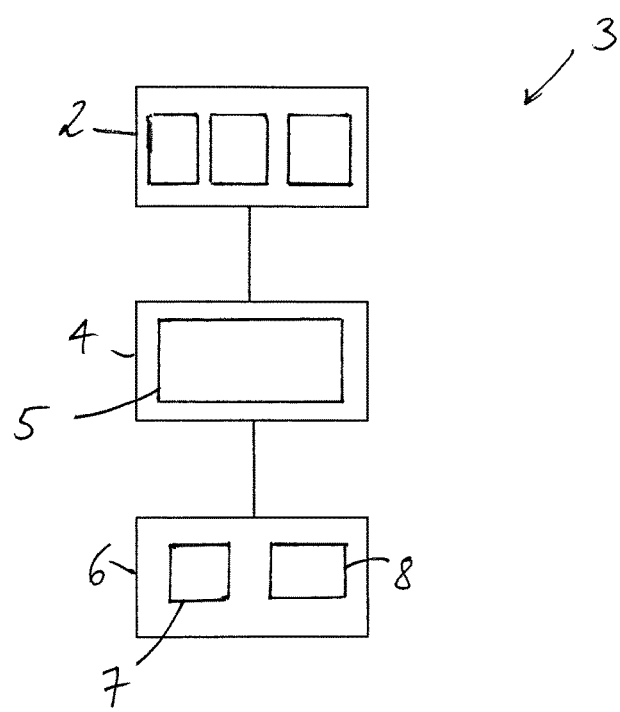

FIG. 2 shows an embodiment of a driver assistance system 3. This driver assistance system 3 may be installed, for instance, in the vehicle 1 shown in FIG. 1. The driver assistance system 3 includes one or more cameras 2 (for example, three cameras, as described above) and a device 4 for detecting elliptic structures in images. The device 4 is configured to receive signals from the camera of the cameras 2. The signals represent the images of the cameras 2 and include image data, such as image values of the image points of the images. The device 4 includes an image data processing unit 5 which is configured to process the images, i.e. the image data, in order to detect elliptic structures in the images and to identify circular traffic signs using information about the detected elliptical structures. To do so, the data processing unit 5 is configured to perform a method of detecting elliptic structures in the images which is described in detail below. For that purpose, the data processing unit 5 may comprise one ore more electronic data processors and one or more data storage units.

The driver assistance system 3 further includes a driver information unit 6 which is configured to provide information on the detected and identified traffic signs to a driver of the vehicle. The driver information unit 6 comprises, for instance, a display 7 and a loudspeaker 8. For instance, the display 7 may be a head-up display configured to display the information on the front screen of the vehicle in which the system 3 is installed.

Figure 3:
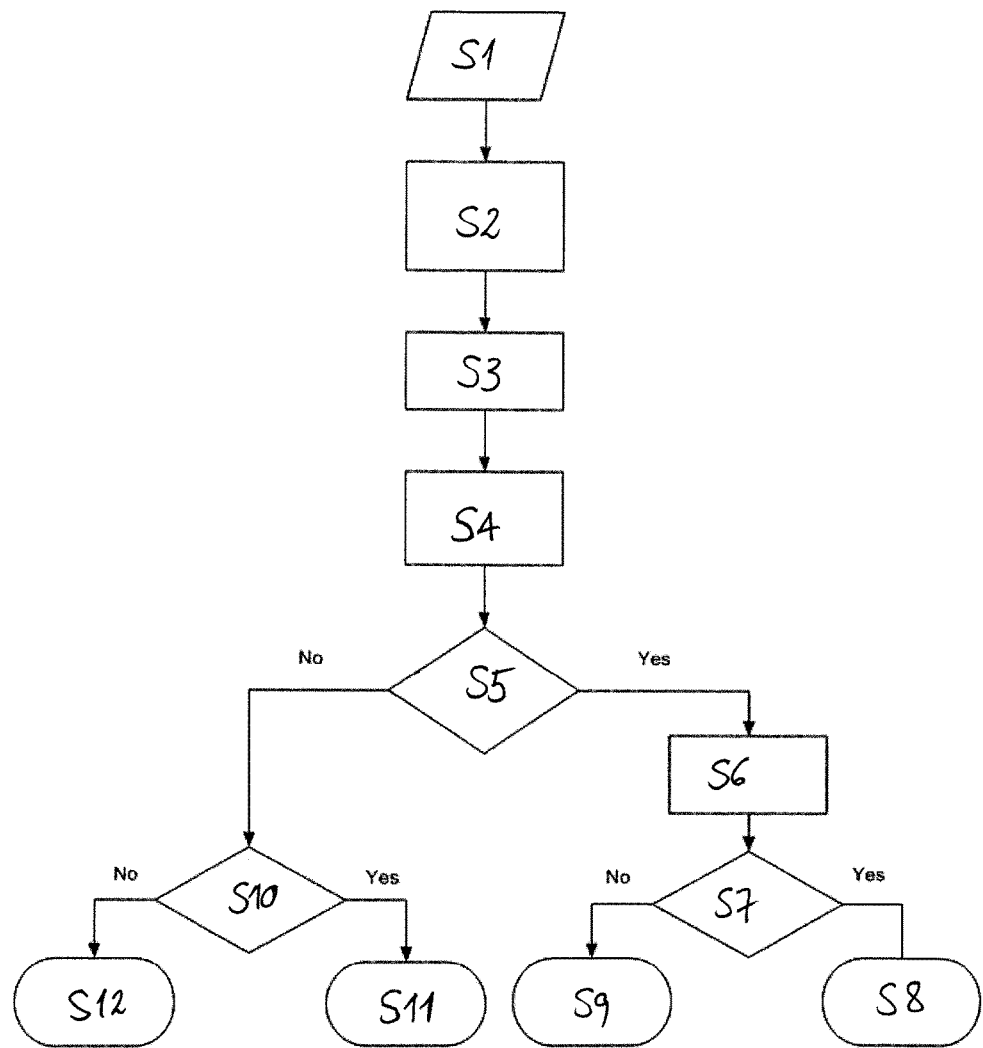

FIG. 3 shows a flow diagram which represents method steps of an embodiment of the method of detecting elliptical structures and identifying traffic signs in an image. These method steps may be performed, for instance, by means of the driver assistance system 3 shown in FIG. 2. The description of the method also refers to FIGS. 4A to 4C which show simplified versions of a digital image 9 which is produced and processed by the method, e.g. by means of the driver assistance system 3 shown in FIG. 2.

Figure 4A:
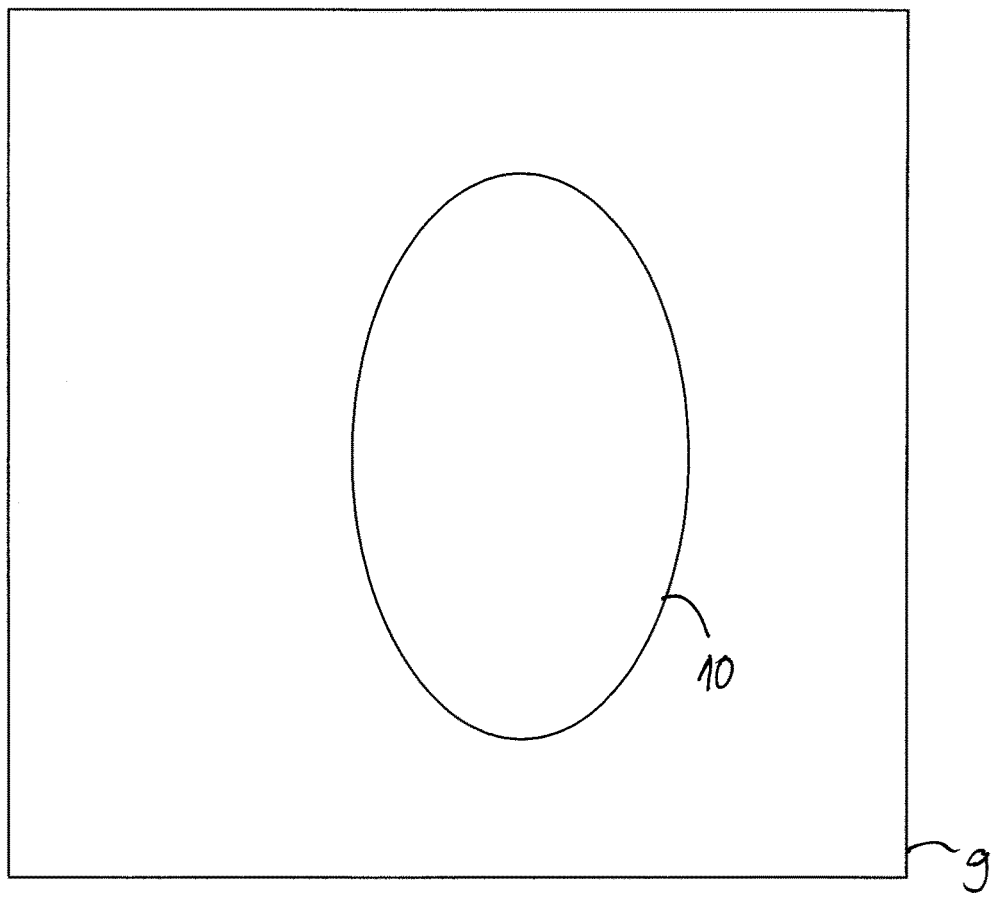

In step S1, a digital image is produced by the camera or by the cameras 2 and received by the data processing unit 5. Typically, this image is a single frame of a video produced by the camera 2. FIG. 4A shows a simplified version of the digital image 9. The image 9 contains an elliptical structure 10 which may, for instance, be part of the image of a circular traffic sign. The circular traffic sign is located on a side of the road on which the vehicle 1 travels and is thus elliptically distorted in the image 9. Possible examples of the circular traffic signs are shown in FIGS. 5A-5D.

In step S2, the data processing unit 5 pre-processes the image 9 by applying a smoothing algorithm. Furthermore, for each image point of the image 9, a gradient of the brightness of the image 9 is calculated. In this case, this includes calculating an absolute value of the gradient and an orientation of the gradient at each image point by means of a gradient extraction algorithm.

In step S3, a circle Hough transform of the image 9 is calculated by means of the data processing unit 5. The step S3 includes:

defining a circle Hough parameter space and a circle Hough accumulator, wherein each parameter point of the circle Hough parameter space defines a circle with a circle centre and a radius, wherein the circle Hough accumulator assigns a value to each parameter point, and identifying, for each one of the parameter points of the circle Hough parameter space, image points of the image 9 which vote for the respective parameter point.

In the present embodiment, an image point is determined as voting for a parameter point when the following conditions are fulfilled: (a) the distance of the image point to the center point specified by the parameter point (approximately) equals the radius specified by the parameter point, (b) the image point has an absolute gradient value larger then a predefined gradient threshold and (c) the orientation of the gradient at this image point is directed (approximately) towards the center point specified by the parameter point or (approximately) in the opposite direction. In principle, this voting scheme may be modified or other voting schemes may be used. For example, one the above condition (b) may be omitted. Furthermore, if the image 9 is pre-processed by applying an edge algorithm to the image 9 in step 2, it is possible to define a voting scheme based on the detected edges of the image (e.g. by using an edge image of the image).

Step S3 further includes calculating the value of the accumulator for each parameter point of the image 9. In the present embodiment, this calculation includes incrementing the values of the circle Hough accumulator depending on the number of image points which are identified as voting for the circles defined by the respective parameter points. In this embodiment, the value of the accumulator for a given parameter point may be calculated, for instance, as the number of image points voting for that parameter point, i.e. fulfilling the conditions (a) to (c) stated above.

In step S4 of the method, parameter points in the circle Hough parameter space at which the value of the circle Hough accumulator exceeds a predefined threshold value and has a local maximum are detected. Thereby, the circular arc-shaped structures 11 are detected as parts of the circles represented by the thus detected parameter points, see FIG. 4B.

Figure 4B:
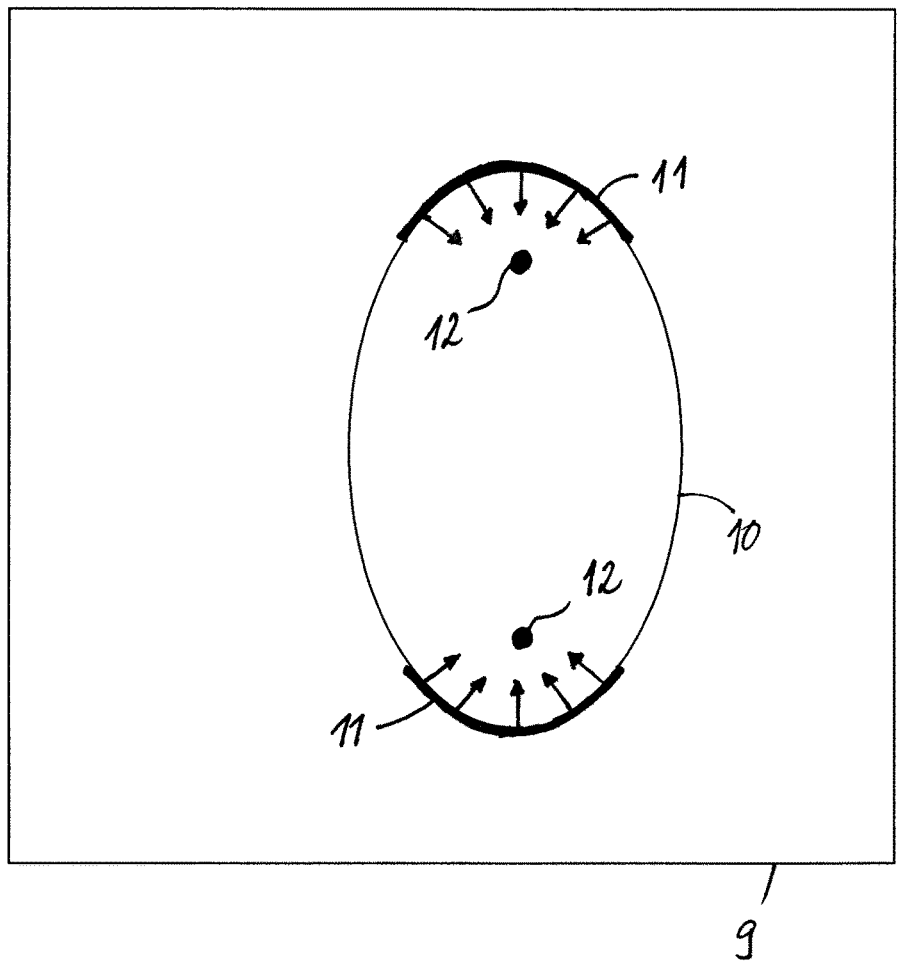

In FIG. 4B, the gradient of the image 9 is represented by arrows for some of the image points that are located on an edge defined by the elliptical structure 10. Furthermore, the two detected circular arc-shaped structures 11 are shown as well as the corresponding center points 12 of the circular arc-shaped structures 11. The two detected circular arc-shaped structures 11 are located at the two ends of the elliptical structure 10. The image points located at these arc-shaped structures 11 vote for the parameter points defining these center points 12, since the above-stated conditions (a) to (c) are fulfilled correspondingly. In particular, the distance of the image points to the respective center points 12 are (approximately) equal to the radius defined by the two parameter points corresponding to these circular arc-shaped structures 11 and the gradients are oriented (approximately) towards the respective center points 12.

In step S5, pairs of circular arc-shaped structures 11 consisting of two of the detected circular arc-shaped structures 11 with substantially equal radii are identified. In this embodiment, the radii of a pair of circular arc-shaped structures 11 are considered as substantially equal when a relative difference between the two radii of the pair of circular arc-shaped structures is, for instance, less than 5% of the larger radius of the two radii. Furthermore, the analysis may be restricted to pairs of circular arc-shaped structures 11 for which a distance between the center points 12 of the circular arc-shaped structures 11 is less than 20 times the value of their radii. Thus, in step 5 it is checked whether the local minima detected in step 4 comprise pairs of local maxima corresponding to pairs of circular arc-shaped structures 11 having substantially equal radii. In case of the image 9 shown in FIG. 4B, the two detected circular arc-shaped structures 11 have been identified as a pair of circular arc-shaped structures 11.

Figure 4C:
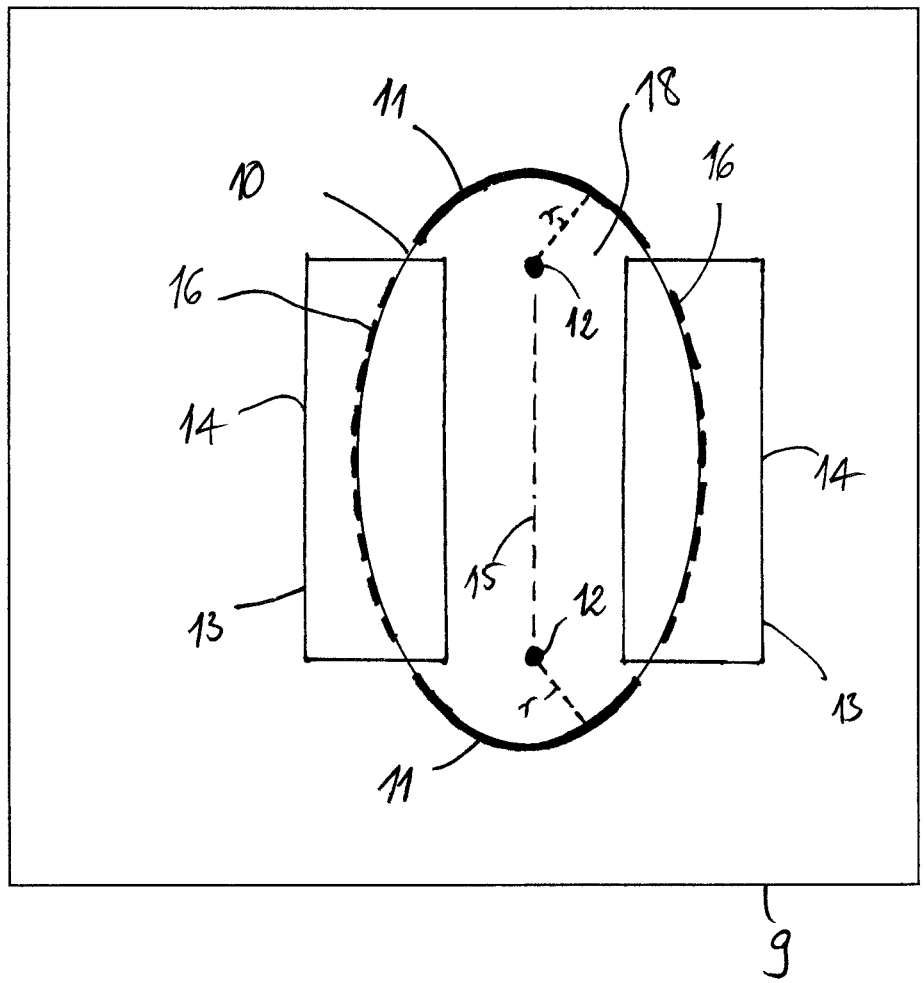

In case that at least one such pair of circular arc-shaped structures 11 has been identified, as in the image 9 shown in FIG. 4B, step S6 is performed which includes:

defining, for each of the pairs of circular arc-shaped structures 11, a search area 14 within the image 9 depending on the center points 12 of the respective pair of circular arc-shaped structures 11, see FIG. 4C, and searching, for each of the pairs of circular arc-shaped structures 11, in the search area 14 defined for the pair of circular arc-shaped structures 11, for a pair of edges 16 connecting the two circular arc-shaped structures 11 of this pair of circular arc-shaped structures 11. This typically includes applying an edge detection algorithm, such as the Canny edge detection or the Sobel edge detection algorithm. Advantageously, the application of this algorithm may be restricted to the defined search areas 14, whereas regions located outside the defined search areas 14 are left out to save time and memory capacities. In embodiments in which edge detection algorithm has already been carried out for the image 9, for instance in step S2, the results of this algorithm, i.e. the detected edges, may be reused for the search for the edges 16 in step S6.

In the present embodiment, the search area 14 defined for the pair of circular arc-shaped structures 11 consists of two subareas 13 which are separated from each other by a straight connection line 15 connecting the two center points 12 of the respective pair of circular arc-shaped structures 11, a distance between the line 15 and the subareas 13 being approximately equal to the radius of the circular arc-shaped structures 11.

FIG. 4C shows the two subareas 13 of the search area 14 defined for this pair of circular arc-shaped structures 11. In this embodiment, the subareas 13 are defined such that they extend along a connection line 15 between the two center points 12 of the respective pair of circular arc-shaped structures 11.

Typically the subareas 13 are shaped as rectangular boxes. The subareas 13 may be defined depending on the distance between the center points and/or on the radii, represented by dashed lines with reference sign r in FIG. 4C, of the corresponding pair of circular arc shaped structures 11. In particular, their lengths, measured in a direction parallel to said connection line 15, their widths, measured in a direction perpendicular to said connection line 15, and/or the distance between the two subareas, measured in a direction perpendicular to said connection line, may defined depending on the distance between the center points and/or depending on the radii r of the corresponding pair of circular arc shaped structures 11.

In step S7, the result of the search for edges 16 in each search area 14 is evaluated. This may include checking, for each one of the defined pairs of circular arc-shaped structures 11, whether a pair of edges 16 is found in the respective search area 14. Furthermore, the evaluation may include, for each one of the found pairs of edges 16, whether each one of two separated subareas 13 of the search area 14 defined for the respective pair of circular arc-shaped structures 11 includes one of the two detected edges. This is the case in the image 9 shown in FIG. 4C, since a pair of edges 16 (represented as bold dashed lines) is found in the search area 14 and each of the subareas 13 contains one of the two edges 16 of this pair.

The evaluation of step S7 may further include, for each of the pairs of edges 16 found for any pair of circular arc-shaped structures 11, at least one of the steps of:

evaluating whether the edges 16 are substantially straight, wherein substantially straight is defined, for instance, as having a radius of curvature larger than twice the radius, of the corresponding circular arc-shaped structures 11, evaluating whether the lengths of the two edges 16 is approximately equal to a distance between the center points 12 of the respective pair of circular arc-shaped structures.

In case that the evaluation of step S7 is positive, i.e. if a pair of edges 16 corresponding to a pair of circular arc-shaped structures 11 is found, step S8 is performed. In step S8, an area 18 enclosed by this pair of edges 16 and this pair of circular arc-shaped structures 11 is identified as an elliptical structure 10. Furthermore, it is determined that a circular traffic sign (which appears elliptically distorted in the image) is present in the image 9 at the location of that area 18. Step 8 also includes providing the driver with information about the detection of a circular traffic sign by means of the driver information unit 6.

In case that the evaluation of step S7 is negative, step S9 is performed. In step 9 it is determined that no circular traffic sign (which appears elliptically distorted in the image) has been detected in the image 9.

In case that a circular arc-shaped structure has been detected, which however is not part of any of the pairs of circular arc-shaped structures identified in step S5, this arc-shaped structure is further evaluated in step S10. In step S10, it is evaluated whether the value of the accumulator at the parameter point corresponding to the detected arc-shaped structure corresponds to a very large local maximum of the accumulator, for instance by evaluating whether the value exceeds a predetermined threshold which is greater than the predefined threshold value used for detecting the circular arc-shaped structures 11.

In case that the evaluation of step S10 is positive, step S11 is performed. In step S11, it is determined that a circular traffic sign is present in the image 9 at the location of the detected complete circle. Furthermore, step 11 includes providing the driver with information about the detection of a circular traffic sign by means of the driver information unit 6.

In case that the evaluation of step S10 is negative, step S12 is performed. In step 12 it is determined that no circular traffic sign has been detected in the image 9.

Furthermore, in steps S8 and S11, the identified circular or elliptical areas in the image may be further analyzed to verify whether they correspond to traffic signs of a particular type.

Figure 5A:
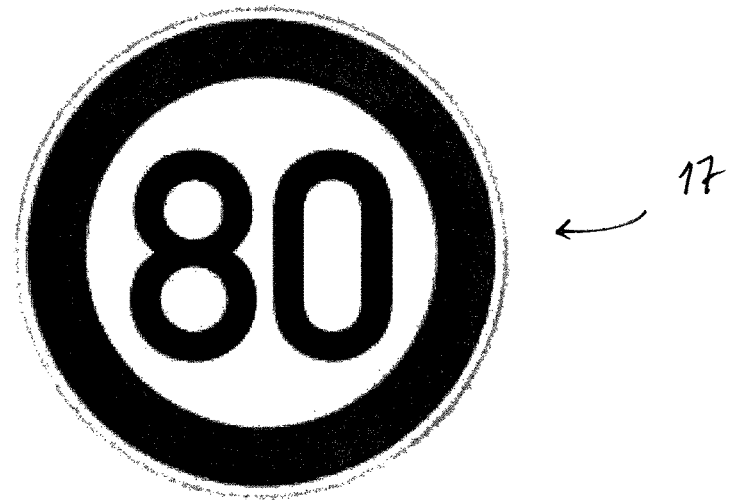
Figure 5B:
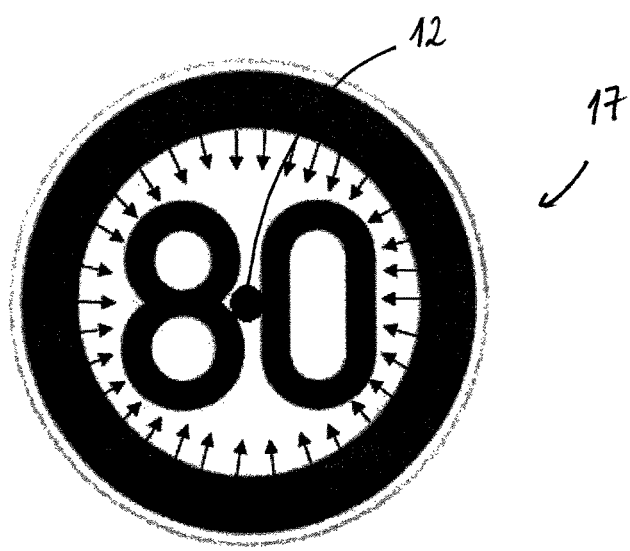
Figure 5C:
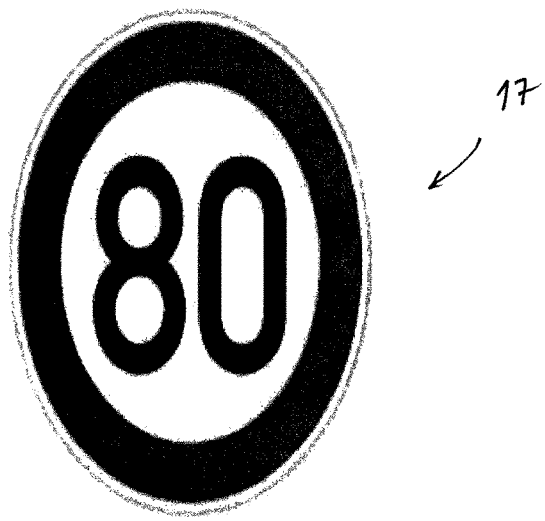
Figure 5D:
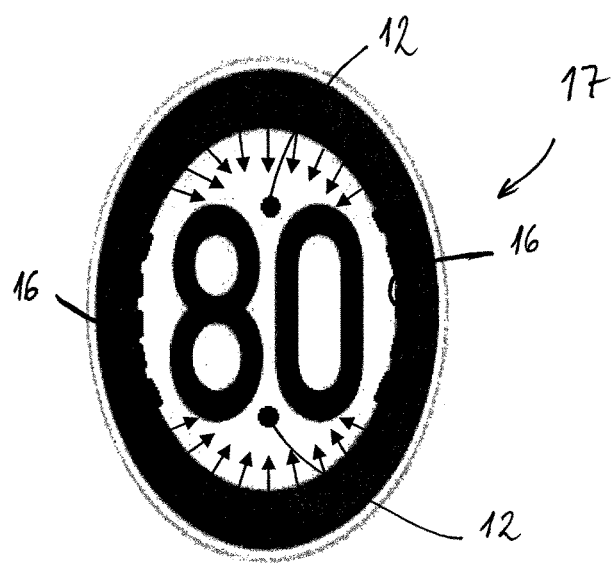

FIGS. 5A and 5B show images of a circular traffic sign 17, wherein the traffic sign 17 appears in its original circular shape. FIGS. 5C and 5D show further images of the same circular traffic sign 17 as shown in FIGS. 5A and 5B. In these images, however, the traffic sign 17 appears elliptically distorted. FIGS. 5B and 5D show gradient vectors (represented as small arrows) and center points 12 which are obtained after applying method steps S1 to S4 to these images. Furthermore, FIG. 5D also shows a detected pair of edges 16 (represented as dashed lines) which are received after applying method steps S5 and S6.

In FIG. 5B, the circle Hough accumulator has one single local maximum with a very large value at the center point 12 of the circular traffic sign 17. This provides a strong indication that the image points voting for this center point 12 form a complete circle around this center point 12. In FIG. 5D, the circular Hough transform has two neighboring local maxima with relatively low values as compared to the local maximum of FIG. 5B. This and the additionally detected pair of edges 16 provide a strong indication for an elliptical structure in this image.

LIST OF REFERENCE SIGNS 1 vehicle
2 camera
3 driver assistance system
4 device
5 data processing unit
6 driver information unit
7 display
8 loudspeaker
9 image
10 elliptical structure
11 circular arc-shaped structure
12 center point
13 subarea
14 search area
15 connection line
16 edge
17 traffic sign
18 area

The invention claimed is:

1. A method of providing assistance to a driver of a vehicle, the method comprising:
producing images of a surrounding of the vehicle by means of at least one camera;
detecting elliptical structures in the images by detecting circular arc-shaped structures in the image by means of a circle Hough transform (CHT) of the image, wherein a radius and a center point are determined for each circular arc-shaped structure, identifying pairs of circular arc-shaped structures consisting of two of the detected circular arc-shaped structures with substantially equal radii, defining, for each of the pairs of circular arc-shaped structures, a search area within the image depending on the center points of the respective pair of circular arc-shaped structures, searching, for each of the pairs of circular arc-shaped structures, in the search area defined for the pair of circular arc-shaped structures, for a pair of edges connecting the two circular arc-shaped structures of this pair of circular arc-shaped structures, and identifying, if a pair of edges connecting the two circular arc-shaped structures of a pair of circular arc-shaped structures is found, an area enclosed by this pair of edges and this pair of circular arc-shaped structures as an elliptical structure; and
identifying circular traffic signs using information about detected elliptical structures.

2. The method of claim 1, wherein the step of detecting circular arc-shaped structures includes the steps of:
defining a circle Hough parameter space and a circle Hough accumulator, wherein each parameter point of the circle Hough parameter space defines a circle in the image, and wherein the circle Hough accumulator assigns a value to each parameter point,
identifying image points of the image which vote for one or more of the circles defined by the parameter points,
increasing the values of the circle Hough accumulator depending on the number of image points which are identified as voting for the circles defined by the respective parameter points,
detecting parameter points in the circle Hough parameter space at which the circle Hough accumulator exceeds a predefined threshold value and/or at which the circle Hough accumulator has a local maximum, wherein the detected circular arc-shaped structures are represented by the detected parameter points.

3. The method of claim 2, wherein a detected circular arc-shaped structure which is not included in any of the identified pairs of circular arc-shaped structures is identified as a complete circle if the value of the circle Hough accumulator at the parameter point representing this detected circular arc-shaped structure exceeds a predefined threshold.

4. The method of claim 1, wherein, for each of the identified pairs of circular arc-shaped structures, the search area of the pair of circular arc-shaped structures consists of two subareas which are separated from each other by a straight connection line connecting the two center points of this pair of circular arc-shaped structures.

5. The method of claim 4, wherein, for each of the identified pairs of circular arc-shaped structures, the step of searching for a pair of edges is restricted to searching for a pair of edges for which each one of the two subareas defined for this pair of circular arc-shaped structures includes exactly one of the two edges of this pair of edges.

6. The method of claim 1, including the step of:
pre-processing the image, before calculating the circle Hough transform (CHT) of the image, by applying a gradient extraction and/or an edge detection algorithm to the image to determine gradients and/or to detect edges in the image and
using a result of the pre-processing step for calculating the circle Hough transform (CHT) of the image.

7. The method of claim 6, wherein the step of searching the pairs of edges in the defined search areas includes:

assessing edges of the image which have been detected by means of the edge detection algorithm applied to the image before calculating the circle Hough transform of the image.

8. The method of claim 1, wherein the step of searching for the pairs of edges includes applying an edge detection algorithm exclusively to the defined search areas after calculating the circle Hough transform of the image.

9. The method of claim 1, wherein the method further includes, for at least one of the pairs of edges which has been found for one of the identified pairs of circular arc-shaped structures, at least one of the steps of:
   evaluating whether the edges are substantially straight,
   comparing the lengths of the two edges with a distance between the center points of the respective pair of circular arc-shaped structures.

10. The method of claim 1, the method further comprises providing information about identified circular traffic signs to the driver by means of a driver information unit.

11. A driver assistance system, comprising:
   at least one camera for producing images of a surrounding of a vehicle,
   a device for detecting elliptical structures in an image, comprising a data processing unit detecting circular arc-shaped structures in the image by means of a circle Hough transform (CHT) of the image, a radius and a center point being determined for each circular arc-shaped structure, identifying pairs of circular arc-shaped structures consisting of two of the detected circular arc-shaped structures with substantially equal radii, defining, for each of the pairs of circular arc-shaped structures, a search area within the image depending on the center points of the respective pair of circular arc-shaped structures, searching, for each of the pairs of circular arc-shaped structures, in the search area defined for the pair of circular arc-shaped structures, for a pair of edges connecting the two circular arc-shaped structures of this pair of circular arc-shaped structures, and identifying, if a pair of edges connecting the two circular arc-shaped structures of a pair of circular arc-shaped structures is found, an area enclosed by this pair of edges and this pair of circular arc-shaped structures as an elliptical structure, wherein the data processing unit of the device is coupled to the at least one camera to receive the images from the camera,
   a driver information unit coupled to the data processing unit and providing information on identified circular traffic signs to the driver.

12. The system of claim 11, wherein the data processing unit of the device:
   detects circular arc-shaped structures in the image by means of a circle Hough transform (CHT) of the image, wherein a radius and a center point are determined for each circular arc-shaped structure,
   identifies pairs of circular arc-shaped structures consisting of two of the detected circular arc-shaped structures with substantially equal radii,
   defines, for each of the pairs of circular arc-shaped structures, a search area within the image depending on the center points of the respective pair of circular arc-shaped structures,
   searches, for each of the pairs of circular arc-shaped structures, in the search area defined for the pair of circular arc-shaped structures, for a pair of edges connecting the two circular arc-shaped structures of this pair of circular arc-shaped structures, and
   identifies, if a pair of edges connecting the two circular arc-shaped structures of a pair of circular arc-shaped structures is found, an area enclosed by this pair of edges and this pair of circular arc-shaped structures as an elliptical structure.

13. A vehicle comprising the driver assistance system of claim 11, wherein the at least one camera is installed in the vehicle to produce images of a surrounding of the vehicle.

\* \* \* \* \*